Dec. 3, 1935.  R. G. LOCKETT  2,022,862
ELECTRIC MOTOR CONTROLLER
Filed May 3, 1934  2 Sheets-Sheet 2

Inventor
Ralph G. Lockett
By Frank M. Hubbard
Attorney

Patented Dec. 3, 1935

2,022,862

UNITED STATES PATENT OFFICE 2,022,862

ELECTRIC MOTOR CONTROLLER

Ralph G. Lockett, Wauwatosa, Wis., assignor to Cutler-Hammer, Inc., Milwaukee, Wis., a corporation of Delaware Application May 3, 1934, Serial No. 723,674

18 Claims. (Cl. 192—148)

This invention relates to improvements in electric motor controllers, and more particularly relates to improvements in control means for the driving motors of washing machines and the like.

In the operation of washing machines of the rotary cylinder type it is desired to effect accurate stopping of the cylinder in a predetermined rotary or angular position or in any one of a number of predetermined positions and it is an object of the present invention to provide automatic control means for the driving motors of washing machines to effect stopping of the cylinder in the desired manner aforementioned.

Another object of the invention is to provide a control system including means to be driven by the reversible driving motor of a washing machine to effect operation of the motor in a manner to provide for accurately stopping the rotary cylinder of the machine in a predetermined position.

Various other objects and advantages of the invention will hereinafter appear.

The accompanying drawings illustrate certain embodiments of the invention which will now be described, it being understood that the embodiments illustrated may be modified in certain respects without departing from the scope of the appended claims.

In the drawings, Figure 1 schematically and diagrammatically illustrates my invention embodied in a control system for the driving motor of a washing machine.

Figure 1:
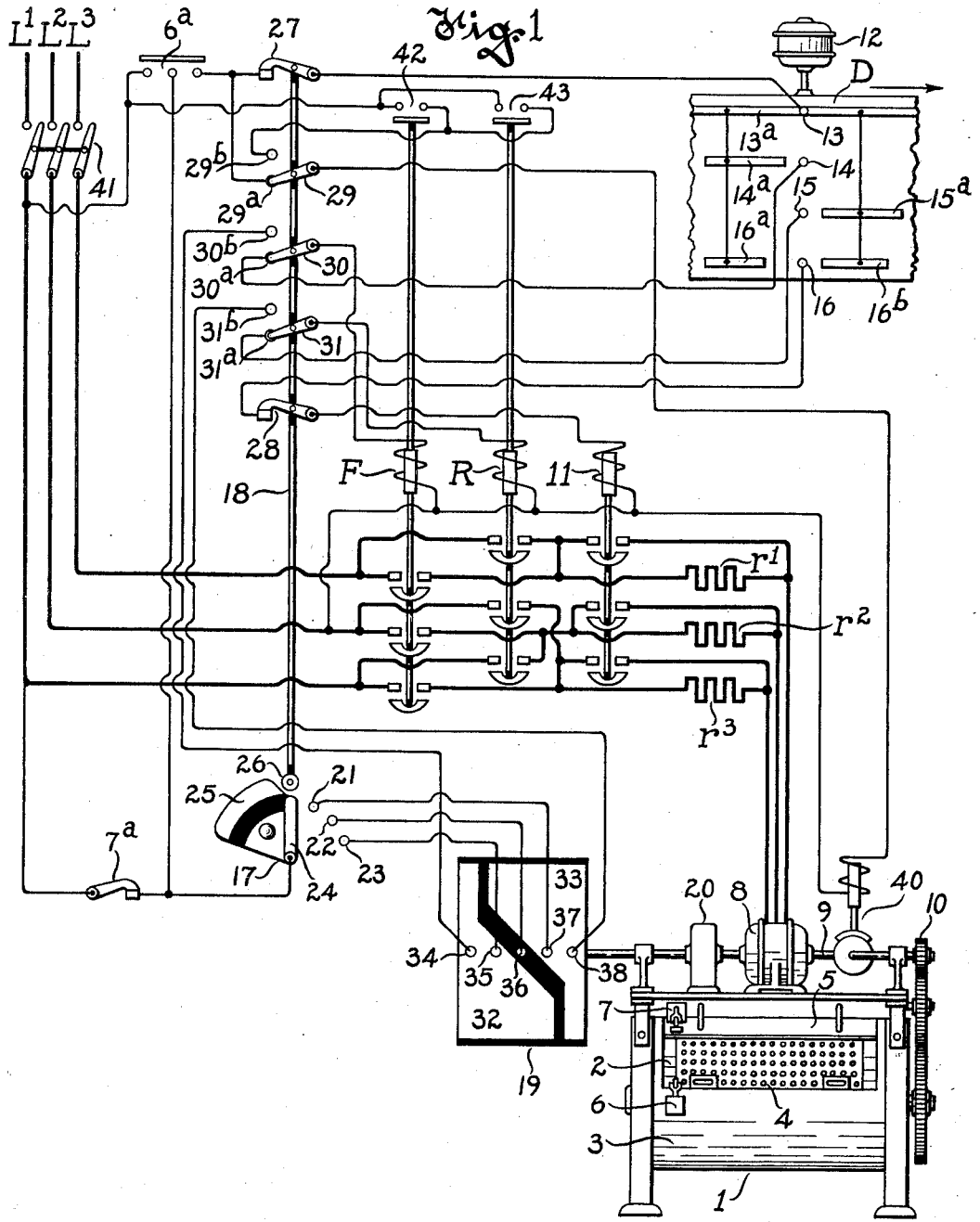

Referring to Fig. 1 of the drawings, the numeral 1 designates in general a motor operated washing machine of a known type, to the control of operation of which the means herein described are particularly adapted. Said washing machine comprises an inner cylinder or container 2 which is rotatably supported within a stationary tub or casing 3. The interior of the cylinder 2 may be divided into a plurality of compartments, each compartment being provided with a movable cover, one of which is shown at 4 in register with an opening in the tub 3. A door 5 on tub 3 when in open position, as shown, provides access to the cylinder 2, and when closed is adapted to seal the opening in said tub to render the same watertight.

Two normally open switches 6 and 7 are mounted on the tub 3 and the same are adapted to be mechanically operated to closed position selectively by the tub door 5 when the latter is moved into its fully closed or fully open position. The contacts $6^a$ and $7^a$, respectively, of switches 6 and 7 are shown diagrammatically in Fig. 1.

The cylinder 2 is arranged to be driven by a motor 8 through the medium of a shaft 9 and a gear drive indicated at 10. Motor 8 is adapted to be supplied with current from a suitable source of supply represented by lines $L^1$, $L^2$, $L^3$, subject to control by the electromagnetically operable switches F and R, accelerating switch 11 and a reversing and accelerating drum D. Drum D, as shown, is adapted to be continuously driven unidirectionally by a pilot motor 12. Said drum comprises a set of stationary contacts 13 to 16, inclusive, and the movable contacts $13^a$, $14^a$, $15^a$, $16^a$ and $16^b$.

A manually operable selector switch 17, a transfer switch 18 and a drum type switch 19, the latter being driven by the motor 8 through the medium of a suitable gear drive indicated at 20, are jointly adapted to effect control of said motor in a manner to provide for stopping the cylinder 2 in any one of a number of preselectable positions thus bringing the desired one of the cylinder doors 4 into register with the tub door 5. The selector switch 17 comprises three stationary contacts 21, 22, 23 and a manually operable contactor 24 which is selectively engageable with said stationary contacts.

Associated with the contactor 24 is a cam member 25 which is arranged to engage a roller follower 26 upon movement of said contactor from its illustrated off position into engagement with any of the stationary contacts 21, 22, 23 to thereby effect actuation of the transfer switch 18. Said transfer switch is provided with normally closed contacts 27, 28 and the contactors 29, 30, 31, each of the latter being normally in engagement with an associated lower contact $29^a$, $30^a$, $31^a$, respectively, and being movable into engagement with the respective upper contacts $29^b$, $30^b$, $31^b$ simultaneously with movement of contacts 27, 28 to open position.

The drum switch 19 comprises the movable contacts or segments 32, 33, and a set of stationary contacts 34 to 38, inclusive, the movable contacts 32, 33 being rotatably operated by the motor 8 through the aforementioned drive 20. The stationary contacts 35, 36, 37 of drum switch 19 are connected to the stationary contacts 23, 22, 21, respectively, of the selector switch 17 and it is to be noted that the contacts 21, 22, 23 and the contacts 35, 36, 37 correspond in number to the number of compartments in the cylinder 2.

An electromagnetically operated brake 40 is associated with the drive shaft 9, said brake being rendered effective to stop the washing machine when power connections for the motor 8 are interrupted in any one of several ways to be hereinafter described. A line switch 41 is adapted to connect the aforedescribed control system to lines $L^1$, $L^2$, $L^3$.

The operation of the control system is as follows:

Assuming closure of the tub door 5, the contacts 6a of the door switch 6 will be closed and the contacts 7a of the door switch 7 will be open, and assuming closure of the line switch 41, an energizing circuit for release of brake 40 will be established, said circuit extending from line $L^1$ through the outside contacts of 6a, through down contact 29a and contactor 29 of transfer switch 18 and through the winding of said brake to line $L^2$. Further assuming operation of the pilot motor 12, an energizing circuit will be established for one or the other of the motor switches F or R, depending upon the position of drum D. However, assuming the position of drum D to be as illustrated an energizing circuit will be established for the switch F when the movable contact 14a engages the stationary contact 14, said circuit extending from line $L^1$ through the outside contacts of 6a, through contacts 27 of transfer switch 18, through stationary contact 13, movable contacts 13a, 14a and stationary contact 14 of drum D, through down contact 30a and contactor 30 of transfer switch 18 and through the winding of switch F to line $L^2$. Switch F responds to establish power connections for the motor 8 through resistances $r^1$, $r^2$, $r^3$ to effect operation of said motor in the forward direction at slow speed.

Continued rotation of drum D effects engagement of the movable contact 16a with the stationary contact 16, establishing for the accelerating switch 11 an energizing circuit extending from line $L^1$ through the outside contacts of 6a, contacts 27 of transfer switch 18, through stationary contact 13, movable contacts 13a, 16a and stationary contact 16 of drum D, through contacts 28 of said transfer switch and through the winding of said accelerating switch to line $L^2$. Switch 11 responds to short-circuit the resistances $r^1$, $r^2$, $r^3$ to effect operation of the motor in the forward direction at full speed.

Continued rotation of drum D disengages movable contacts 14a, 16a from the stationary contacts 14, 16, respectively, thereby deenergizing switches F and 11, whereupon the motor 8 and the parts driven thereby will coast until the movable contact 15a is rotated into engagement with the stationary contact 15 to establish for the switch R an energizing circuit extending from line $L^1$ through the outside contacts of 6a, contacts 27, through the stationary contact 13, movable contacts 13a, 15a and stationary contact 15 of drum D, through the down contact 31a and contactor 31 of transfer switch 18 and through the winding of switch R to line $L^2$. Switch R responds to establish power connections for motor 8 through resistances $r^1$, $r^2$, $r^3$ to effect operation of said motor in the reverse direction at slow speed.

Continued rotation of drum D effects engagement of the movable contact 16b with the stationary contact 16, establishing for the accelerating switch 11 an energizing circuit extending from line $L^1$ through the outside contacts of 6a, contacts 27, through stationary contact 13, movable contacts 13a, 16b and stationary contact 16, through contacts 28 and through the winding of switch 11 to line $L^2$. Switch 11 responds to short-circuit the resistances $r^1$, $r^2$, $r^3$ to effect operation of motor 8 in the reverse direction at full speed.

The aforedescribed circuit connections are alternated periodically by the drum D pending the performance of any of the following manual operations; (1) the line switch 41 may be opened to interrupt power connections to the control system, whereupon the brake 40 acts to stop the motor 8 and cylinder 2; or (2) the tub door 5 may be opened to effect opening of the contacts 6a of door switch 6, thereby interrupting the energizing connections through drum D and effecting application of the brake 40; or (3) the contactor 24 of selector switch 17 may be moved into engagement with one of the stationary contacts 21, 22 or 23, thereby effecting stopping of the washing machine in the following manner:

Assuming that the washing machine is operating in the manner aforedescribed and that it is desired to stop the cylinder 2 in the position illustrated, that is, with the door 4 of the cylinder compartment corresponding to stationary contact 22 brought into register with the tub door 5. If the tub door 5 is left closed, contacts 6a of door switch 6 will be closed. Movement of contactor 24 into engagement with the stationary contact 22 actuates the transfer switch 18 in the manner aforedescribed. Opening of contacts 27 and 28 interrupts circuit connections to drum D and the winding of accelerating switch 11, respectively. The brake 40 will be energized through alternative circuits including either the contacts 42 or the contacts 43 of motor switches F and R, respectively, and the contacts 29, 29b of transfer switch 18. If neither of the switches F, R is energized at the time of movement of the transfer switch 18, the brake 40 will be applied. However, momentum of the cylinder 2 and motor 8 carries the movable contacts 32, 33 around to establish an energizing circuit for either of the switches F or R, depending upon the position of said movable contacts. If for switch F, the circuit extends from line $L^1$ through the left-hand and middle contacts of 6a, through contactor 24 and contact 22 of selector switch 17, through contacts 36, 32 and 34 of drum switch 19, through contacts 30b, 30 of transfer switch 18 and through the winding of switch F to line $L^2$. Response of switch F effects operation of motor 8 in a forward direction at slow speed. The brake 40 is energized through contacts 42 and 29b, 29. Motor 8 operates in a forward direction until the contact 32 disengages contact 36 whereupon switch F drops out to deenergize motor 8 and the brake 40.

If the cylinder 2 and motor 8 coast to effect engagement of contact 33 with contact 36 an energizing circuit will be established for switch R from line $L^1$ through the left-hand and middle contacts of 6a, through contactor 24 and contact 22, through contacts 36, 33, 38 through contacts 31b, 31 of transfer switch 18 and through the winding of switch R to line $L^2$. Switch R responds to effect operation of motor 8 in the reverse direction at slow speed and the brake 40 is energized through contacts 43 and 29b, 29. Said motor operates in the reverse direction at slow speed until the contact 33 disengages contact 36 whereupon switch R drops out to deenergize said motor and the brake 40.

If, again, the contact 32 engages the contact 36 the motor 8 operates in the forward direction. The circuit connections for motor 8 are alternated in this manner to insure a decreasing amplitude of oscillation of the washer cylinder until the latter is brought to rest, which is when the contacts 32, 33 come to rest with the stationary contact 36 intermediate the same.

If it is subsequently desired to bring into register with the tub door 5 one of the other compartments of cylinder 2, the contactor 24 is moved from stationary contact 22 to either of the stationary contacts 21 or 23, whereupon the drum switch 19 effects operation of the motor 8 in the manner aforedescribed to move the cylinder 2 into the selected position.

Positioning of the cylinder 2 can also be effected with the tub door 5 in fully open position, in which position the contacts 7$^a$ of door switch 7 will be closed and the contacts 6$^a$ of door switch 6 will be open. The aforedescribed control circuits through the selector switch 17 and the drum switch 19 are then completed through the contacts 7$^a$.

Figure 2:
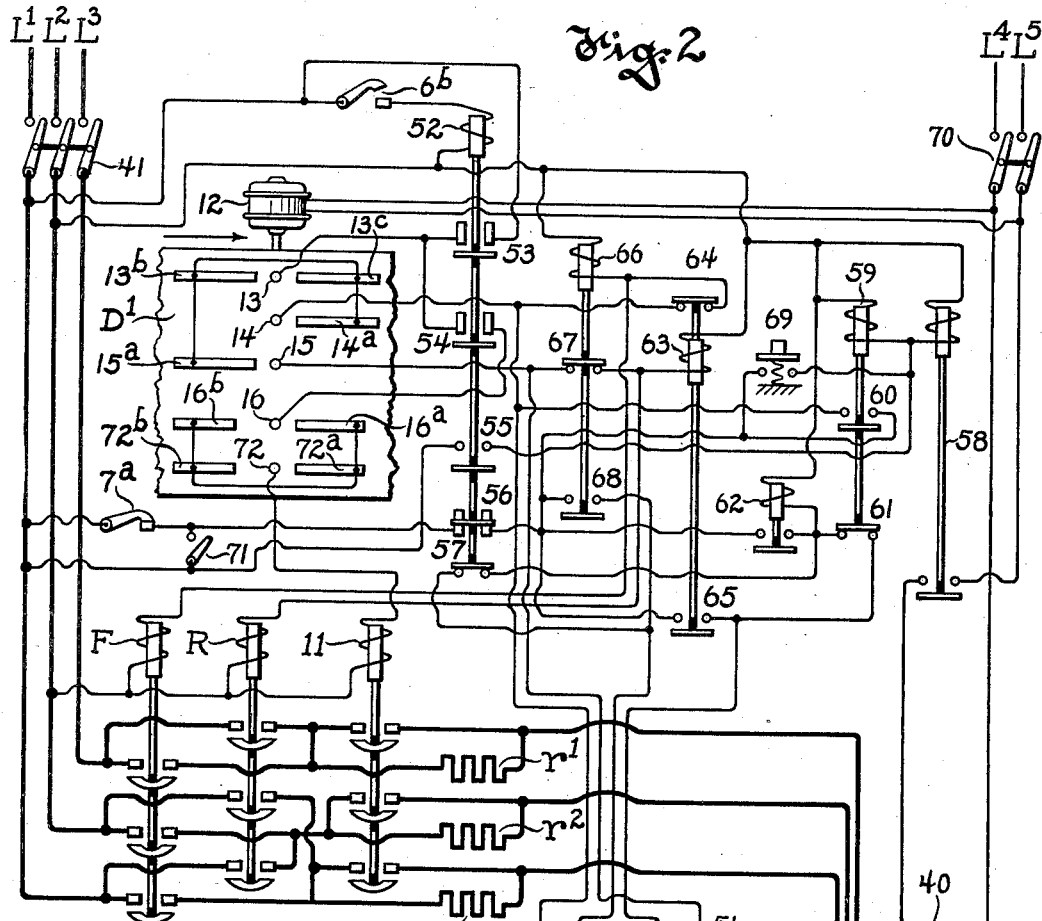
Fig. 2 illustrates a modified form of motor control system embodying my invention.
Figure 3:
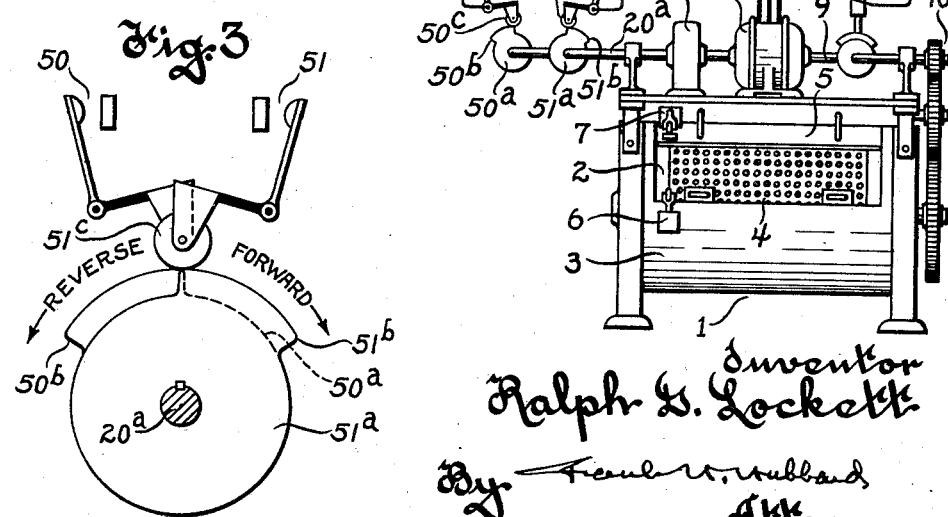
Fig. 3 illustrates in detail certain of the mechanical and electrical elements shown in Fig. 2.

The modified system shown in Fig. 2 is adapted to control the positioning of the cylinder 2 through the medium of cam-operated limit switches shown at 50 and 51. The cams 50$^a$ and 51$^a$ of switches 50 and 51 are shown as being mounted upon a shaft 20$^a$ which is driven by the motor 8 through the gear drive 20. Fig. 3 illustrates the relative positions of the cam projections 50$^b$ and 51$^b$. It will be noted that said projections overlap only a relatively small amount, and consequently the switches 50 and 51 are open simultaneously only during a relatively small degree of rotation of the shaft 20$^a$. The gear drive 20 is preferably arranged to effect one complete revolution of shaft 20$^a$ during movement of cylinder 2 through an angle corresponding to each of its respective compartments. Thus if said cylinder is divided into three compartments, three revolutions of said shaft are effected during each revolution of said cylinder. The cam projections 50$^b$ and 51$^b$ are arranged to overlap at a point where they engage both rollers 50$^c$ and 51$^c$ simultaneously with the accurate positioning of any one of the cylinder doors 4 in register with the tub door 5.

Periodic reversal and acceleration of motor 8 is controlled substantially as described in connection with Fig. 1, through the medium of switches F and R, accelerating switch 11 and a reversing and accelerating drum D$^1$. A relay 52, provided with normally open contacts 53, 54 and 55 and normally closed contacts 56 and 57, is adapted to provide for connection of drum D$^1$ to line L$^1$ and to effect energization of brake 40 through a relay 58.

The system further includes a relay 59, having normally open contacts 60 and normally closed contacts 61; a relay 62; a relay 63, having normally closed contacts 64 and normally open contacts 65; a relay 66 having normally closed contacts 67 and normally open contacts 68, and a manually operable, normally open push-button switch 69. The brake 40 and the pilot motor 12 are supplied from a suitable source of direct current, indicated at lines L$^4$, L$^5$ and are adapted to be connected thereto by the line switch 70. A switch 71 is shown connected in parallel with the door switch contacts 7$^a$ and as will be described is adapted to control operation of the foregoing system in a manner to provide for positioning the cylinder 2 so as to bring the door 4, which is nearest the tub door 5 at the time the latter is opened, in register with said tub door.

The system will be described first as it operates with the switch 71 open, in which case, as will be apparent from the following, the system acts to deenergize the motor 8 and apply the brake 40 immediately upon opening of the tub door 5.

With the line switch 70 closed the pilot motor 10 12 operates to rotate the drum D$^1$ and with line switch 41 closed, closure of the tub door 5 effects opening of the contacts 7$^a$ of door switch 7 and closure of the contacts 6$^b$ of door switch 6, establishing for relay 52 an energizing circuit extending from line L$^1$ through contacts 6$^b$ of door switch 6 and the winding of relay 52 to line L$^2$. Relay 52 responds to connect the stationary contacts 13 and 16 of drum D$^1$ to line L$^1$ through contacts 53 and 54, respectively, and to effect release of brake 40 through relay 58, said relay being energized through contacts 55. Response of relay 52 also effects opening of its contacts 56 and 57. An energizing circuit for relay 59 is also completed through contacts 55 of relay 52, effecting closure of contacts 60 of relay 59 and opening of contacts 61. Movement of drum D$^1$ from the position illustrated establishes an energizing circuit for the switch R extending from line L$^1$ through contacts 53 of relay 52, through stationary contact 13, movable contacts 13$^b$, 15$^a$ and stationary contact 15 of said drum, through normally closed contacts 67 of relay 66 and through the winding of switch R to line L$^2$. Switch R responds to establish power connections through resistances $r^1$, $r^2$, $r^3$ for reverse operation of motor 8 at slow speed. Simultaneously with energization of switch R an energizing circuit is established for relay 63 extending from line L$^1$ through contacts 67 of relay 66 as aforedescribed, and through the winding of relay 63 to line L$^2$. Relay 63 responds to open its contacts 64 and close its contacts 65.

Further movement of drum D$^1$ effects energization of accelerating switch 11 by a circuit extending from line L$^1$ through contacts 53 and 54 of relay 52, through stationary contact 16, movable contacts 16$^b$, 72$^b$ and stationary contact 72 of said drum and through the winding of switch 11 to line L$^2$. Switch 11 responds to short-circuit resistances $r^1$, $r^2$, $r^3$ to effect reverse operation of the motor at full speed.

Further movement of the drum D$^1$ effects deenergization of the switches R and 11 and of relay 63 and subsequently establishes an energizing circuit for the switch F and relay 66, said circuit extending from line L$^1$ through contacts 53, through contacts 13, 13$^c$, 14$^a$ and 14 of said drum, through normally closed contacts 64 of relay 63 and through the windings of switch F and relay 66 to line L$^2$. Switch F responds to establish power connections through resistances $r^1$, $r^2$, $r^3$ for forward operation of motor 8 at slow speed. Response of relay 66 opens contacts 67 and closes contacts 68.

Further movement of drum D$^1$ effects energization of the switch 11 by a circuit extending from line L$^1$ through contacts 53 and 54 of relay 52, through contacts 16, 16$^a$, 72$^a$ and 72 of said drum and through the winding of switch 11 to line L$^2$. Switch 11 responds to short-circuit resistances $r^1$, $r^2$, $r^3$ to effect forward operation of the motor at full speed.

The aforedescribed circuit connections are alternated periodically by the drum D$^1$ pending opening of the tub door 5 which effects opening of the contacts 6b of door switch 6. Deenergization of relay 52 results, thus interrupting the circuits through drum D¹ and effecting application of brake 40. The cylinder 2 may then be positioned to bring the desired door 4 into register with the tub door 5 by depressing the push button switch 69 to operate the motor 8 at slow speed in the forward direction until the cylinder has rotated into approximately the correct position, when the push-button switch is released and the cam-operated switches 50 and 51 effect accurate positioning of the cylinder 2. It will be noted that the push-button switch 69 may be operated substantially simultaneously with opening of the tub door 5 or at any time after the machine has stopped. Thus, with the tub door 5 in full open position, the door switch 7 is closed, and upon depression of push-button switch 69, an energizing circuit for relays 58 and 59 is established, said circuit extending from line L¹, through contacts 7ª, through contacts 56 of relay 52, through push-button switch 69, and through the windings of relays 58 and 59 to line L². Response of relay 58 effects release of brake 40 while response of relay 59 opens contacts 61 and closes contacts 60, completing an energizing circuit for the switch F and for relay 66, said circuit extending from line L¹ through contacts 7ª, contacts 56, through contacts 60, through contacts 64 of relay 63 and through the windings of switch F and relay 66 to line L². Switch F responds to establish power connections through resistances r¹, r², r³ to effect forward operation of motor 8 at slow speed. Response of relay 66 opens contacts 67 and closes contacts 68, establishing an energizing circuit for relay 62 extending from line L¹ through contacts 7ª, contacts 56, through contacts 68, through contacts 57 of relay 52 and through the winding of relay 62 to line L².

Push-button switch 69 is held depressed until the cylinder 2 has rotated into approximately the desired position. In this connection it may be noted that the individual compartments of cylinder 2 may be marked with distinguishing indicia in order to facilitate positioning of the desired compartment in register with the tub door 5. Upon release of said push-button switch relays 58 and 59 are deenergized, opening of the contacts of relay 58 effecting application of brake 40. Relay 62 is maintained energized through its own contacts and an energizing circuit is established for either switch F or switch R, depending upon the position of cams 50ª, 51ª. If the cylinder 2 has not moved far enough forward, the energizing circuit for switch F is maintained through door switch contacts 7ª, contacts 56 of relay 52, through the contacts of relay 62, contacts 57 of relay 52, through the cam-operated switch 50, contacts 64 of relay 63 and through the windings of switch F and relay 66. When the roller 50ᶜ is lifted by cam projection 50ᵇ at the point where the cam projections overlap, switch 50 is opened, deenergizing switch F and relay 66. If the momentum of the cylinder 2 and motor 8 effects rotation of the cams far enough forward, the roller 51ᶜ will drop off the cam projection 51ᵇ at the point where the projections overlap, closing switch 51, thus energizing switch R and relay 63 by a circuit extending through the contacts of relay 62 as aforedescribed, through contacts 61 of relay 59, through switch 51, through contacts 67 of relay 66 and through the windings of switch R and relay 63. Response of switch R establishes power connections for reverse operation of motor 8 at slow speed. The cylinder 2 is rotated in the reverse direction until the cam projection 51ᵇ lifts the roller 51ᶜ, opening switch 51 to deenergize switch R and relay 63.

If the cylinder 2 rotates too far in the reverse direction, the switch 50 will again be closed to energize switch F to effect operation of the motor in the forward direction at slow speed.

Operation of the motor 8 is controlled in the aforedescribed manner through a decreasing amplitude of oscillation until it comes to rest, which is when the cams 50ª, 51ª come to rest with both the rollers 50ᶜ, 51ᶜ in the raised positions illustrated in Figs. 2 and 3.

Now, considering operation of the system with the switch 71 in closed position; if the system is assumed to be effecting automatic periodic forward and reverse operation of the motor 8 as aforedescribed, immediately upon opening of the tub door 5, the system will act to control positioning of the cylinder 2 to bring the cylinder door 4, which is nearest said tub door at the time the latter is opened, in register with said tub door. It is to be understood that by the nearest cylinder door is meant the door which will next come into register with the tub door as determined by the direction in which the cylinder is rotating at the time the tub door is opened.

When the tub door 5 is opened, the contacts 6b of door switch 6 will immediately open to effect deenergization of relay 52 which drops out relays 58 and 59 through opening of contacts 55, effecting application of brake 40. However, as will be noted, the stationary contacts of 53, 54, and 56 of said relay are arranged so that the contacts 56 will close before the contacts 53 and 54 open. Deenergization of relay 52 also insures immediate dropping out of accelerating switch 11 through opening of contacts 53 and 54, if switch 11 is energized at the time through the medium of drum D¹.

Now assuming forward operation of the motor 8 at the time the tub door 5 is opened, the energizing circuit for switch F and relays 66 and 62 will be maintained. The circuit for relay 62 extends from Line L¹ through switch 71, contacts 56 of relay 52 and through the contacts and winding of relay 62 to line L². The circuit for switch F and relay 66 extends from line L¹ through switch 71, contacts 56 to relay 52, through contacts 68 of relay 66, through switch 50 and contacts 64 of relay 63 and through the windings of switch F and relay 66 to line L². Upon response of switch F, the motor 8 operates in the forward direction with the brake 40 applied until the switch 50 is opened, then if the forward momentum of cylinder 2 and motor 8 is great enough, the switch 51 is closed to effect operation of said motor in the reverse direction. The motor 8 is thus controlled by switches 50 and 51 to operate through a decreasing amplitude of oscillation until it finally comes to rest.

If it is subsequently desired to bring into register with the tub door 5 one of the other compartments of cylinder 2, the push-button switch 69 is depressed to effect forward operation of the motor 8 at slow speed until said cylinder is moved into approximately the desired position, whereupon the push-button switch is released, and the cylinder is accurately brought to position by the aforedescribed operation of switches 50 and 51.

Although the aforedescribed arrangement of the gear drive 20 is preferable, it is obvious that the same may be arranged to provide for rotation of shaft 20ª at other rates relative to the rate of rotation of cylinder 2. For example, the gear drive 20 may be arranged to rotate shaft 20ª at the same rate of rotation as that of the cylinder 2, in which case provision can be made for automatically registering one of the compartments of said cylinder with the door 5, as aforedescribed. The other compartments of the cylinder are subsequently brought into register with said door by operation of push-button switch 69 to effect inching of the driving motor 8.

What I claim as new and desire to secure by Letters Patent is:

1. In a controller for motor driven devices, in combination, a rotatably driven element, a reversible motor for driving the same, control means for said motor including means for automatically effecting periodic reversal of the same, and means driven by said motor and adapted to be rendered effective at will for initiating stopping of said element in a predetermined angular position, said last-mentioned means being operable automatically to effect operation of said motor in a manner whereby said element is rotated alternately in opposite directions into said predetermined position in the event of overtravel of said element to either side of said position during the stopping operation.

2. In a controller for motor driven devices, in combination, a rotatably driven element, a reversible motor for driving the same, control means for said motor including means for automatically effecting periodic reversal of the same, and means driven by said motor and adapted to be rendered effective at will for initiating stopping of said element in any one of a plurality of predetermined angular positions selectively, said last mentioned means being operable automatically to effect control of said motor in a manner whereby said element is rotated alternately in opposite directions into said predetermined position in the event of overtravel of said element to either side of said position during the stopping operation.

3. In a controller for motor driven devices, in combination, a rotatably driven element, a reversible motor for driving the same, control means for said motor including means for automatically effecting periodic reversal of the same, and means driven by said motor and adapted to be rendered effective at will for initiating stopping of said element in a predetermined angular position, said last-mentioned means being operable automatically to effect control of said motor in a manner whereby said element is rotated alternately in opposite directions into said predetermined position in the event of overtravel of said element to either side of said position during the stopping operation, and cooperating braking means to be rendered effective to reduce overtravel of said element and to eventually stop and hold the same in said position.

4. In a controller for motor driven devices, in combination, a rotatably driven element, a reversible motor for driving the same, control means for said motor including means for automatically effecting periodic reversal of the same, and means driven by said motor and adapted to be rendered effective at will for stopping said element in any one of a plurality of predetermined angular positions selectively, said last-mentioned means being operable automatically to effect operation of said motor in a manner whereby said element is rotated through a decreasing amplitude of oscillation into said predetermined position, and cooperating braking means for reducing the oscillation of said element and for eventually stopping and holding the same in said predetermined angular position.

5. In a controller for motor driven washing machines, in combination, a tub and a washer cylinder within the same, a periodically reversible motor for rotatably driving said cylinder, control means for said motor including means driven by said motor and adapted to be rendered at will effective to direct stopping of said cylinder in a predetermined angular position, said last-mentioned means being operable to effect operation of said motor in a manner whereby said cylinder is rotated alternately in opposite directions into a predetermined position in the event of overtravel of the same to either side of said position during the stopping operation, and cooperating electro-mechanical braking means adapted to effect reduction of cylinder overtravel and to eventually stop and hold the cylinder in said position.

6. In a controller for motor driven washing machines, in combination, a tub and a washer cylinder within the same, a periodically reversible motor for rotatably driving said cylinder, control means for said motor including means driven by said motor and adapted to be rendered effective at will to direct stopping of said cylinder in any one of a plurality of predetermined angular positions selectively, said last-mentioned means being operable automatically to effect operation of said motor in a manner whereby said cylinder is rotated alternately in opposite directions into a selected position in the event of overtravel of the same to either side of said position during the stopping operation, and automatically controlled mechanical braking means for gradually effecting reduction of overtravel of the cylinder and for finally stopping and holding said cylinder in the selected position.

7. In a controller for motor driven washing machines, in combination, a tub and a washer cylinder within the same, a periodically reversible motor for rotatably driving said cylinder, control means for said motor including means driven by said motor and adapted to be rendered effective at will for initiating stopping of said cylinder in one of a plurality of predetermined angular positions, said last-mentioned means being operable automatically upon initiation of the stopping operation to effect operation of said motor in a manner whereby said cylinder is rotated alternately in opposite directions into said predetermined position in the event of overtravel of the same to either side of said position, manually operable means associated with said last-mentioned means for rendering the same effective and for selecting the position in which said cylinder is to be stopped, and automatically controlled mechanical braking means rendered effective during the stopping operation for reducing overtravel of the cylinder and for finally stopping and holding said cylinder in the selected position.

8. In a controller for motor driven washing machines, in combination, a tub having a movable door, a washer cylinder within said tub having a plurality of circumferentially arranged compartments, a periodically reversible motor for rotatably driving said cylinder, control means for said motor including means driven by said motor and adapted to be rendered effective at will to direct stopping of said cylinder in a position wherein one of said compartments is in register with said tub door, said last-mentioned means being operable automatically to effect operation of said motor in a manner whereby said cylinder is rotated alternately in opposite directions into said compartment and door registering position in the event of overtravel of said cylinder to either side of said position during the stopping operation, automatically controlled mechanical braking means for effecting reduction of overtravel of the cylinder and for finally stopping and holding said cylinder in said registering position, and manually operable means associated with said motor driven means for selectively effecting registry of any other of said compartments with said door.

9. In a controller for motor driven washing machines, in combination, a tub having a movable door, a washer cylinder within said tub having a plurality of circumferentially arranged compartments, a reversible motor for rotatably driving said cylinder, control means for said motor including means for automatically effecting periodic reversal and acceleration of the same, means operable at will to initiate stopping of said motor, said means including means adapted to be rendered effective for stopping the motor with said cylinder in a position wherein one of said compartments is in register with said door, said last-mentioned means including means driven by said motor and adapted upon initiation of said stopping operation to automatically effect operation of the motor in a manner whereby said cylinder is rotated alternately in opposite directions into said compartment and door registering position in the event of overtravel of the same to either side of said registering position, means associated with said last-mentioned means to render the same effective for selectively registering any one of said compartments with said door, and cooperating automatically controlled mechanical braking means adapted to be rendered effective during the stopping operation to reduce overtravel of said cylinder and to finally stop and hold the same in the selected registered position.

10. In a controller for motor driven washing machines, in combination, a tub having a movable door, a washer cylinder within said tub having a plurality of circumferentially arranged compartments, a reversible motor for rotatably driving said cylinder, control means for said motor including means for automatically effecting periodic reversal and acceleration of the same, means operable at will to initiate stopping of said motor, said means including means adapted to be rendered effective for stopping the motor with said cylinder in a position wherein one of said compartments is in register with said door, said last-mentioned means including means driven by said motor and adapted upon initiation of said stopping operation to automatically effect operation of the motor under insured conditions of reduced speed in a manner whereby said cylinder is rotated alternately in opposite directions into said compartment and door registering position in the event of overtravel of the same to either side of said registering position, means associated with said last-mentioned means to render the same effective upon opening of said door to register with said door the compartment nearest the same as determined by the direction of rotation of said cylinder at the time said door is opened, means for subsequently rendering the automatic registering means effective to stop said cylinder in any one of the compartment and door registering positions selectively, and cooperating automatically controlled mechanical braking means to be rendered effective during the stopping operation to reduce overtravel of said cylinder and to finally stop and hold the same in each of said registered positions respectively.

11. In a controller for motor driven washing machines, in combination, a tub having a movable door, a washer cylinder within said tub having a plurality of circumferentially arranged compartments, a reversible motor for rotatably driving said cylinder, control means for said motor including means for automatically effecting periodic reversal and acceleration of the same, said last-mentioned means including a pair of reversing switches, means adapted to be rendered effective for stopping said cylinder in any one of the positions selectively wherein one of said compartments is in register with said door, said last-mentioned means including a drum rotatably driven by said motor, said drum comprising a pair of electrically separated contact members, said contact members being separated in part by a diagonally disposed neutral area, a plurality of stationary contacts arranged for cooperative engagement with said contact members, certain of said stationary contacts being arranged for engagement individually with said neutral area simultaneously with registry of the respective compartments with said door, manually operable means for selectively rendering said last-mentioned stationary contacts effective conjointly with said contact members and certain other of said stationary contacts to effect operation of said reversing switches alternately to control operation of said motor in a manner whereby said cylinder is rotated alternately in opposite directions into a selected compartment and door registering position in the event of overtravel of said cylinder to either side of said position, and cooperating electro-mechanical braking means adapted to be rendered effective during the stopping operation at any time that the cylinder is in the selected registered position for reducing overtravel of the cylinder and for finally stopping and holding the same in said position.

12. In a controller for motor driven washing machines, in combination, a tub having a movable door, a washer cylinder within said tub having a plurality of circumferentially arranged compartments, a reversible motor for rotatably driving said cylinder, control means for said motor including means for automatically effecting periodic reversal and acceleration of the same, said last-mentioned means including a pair of reversing switches, means for automatically stopping said cylinder in any one of the positions wherein one of said compartments is in register with said door, said means including a pair of normally closed switches adapted to be operated to open position by cam members rotatably driven by said motor, said cam members being arranged to operate both of said last mentioned switches to open position when the cylinder is in any one of the compartment and door registering positions, manually operable means for selecting the compartment and door registering position in which said cylinder is to be stopped, and for rendering said cam operated switches effective to operate said reversing switches alternately in the event that the momentum of said cylinder and said motor effects overtravel of said cam members to either side of the point where both of said cam operated switches are held in open position, and cooperative automatically controlled braking means adapted to be rendered effective during the stopping operation for reducing overtravel of said cylinder and said motor and for finally stopping and holding said cylinder in the selected registering position.

13. In a controller for motor driven washing machines, in combination, a tub having a movable door, a washer cylinder within said tub having a plurality of circumferentially arranged compartments, a reversible motor for rotatably driving said cylinder, control means for said motor including means for automatically effecting periodic reversal and acceleration of said motor, means driven by said motor and adapted to be rendered effective to automatically effect accurate stopping of said cylinder in any one of the positions wherein one of said compartments is in register with said door, said last-mentioned means being effective to operate said motor under insured conditions of reduced speed in a manner whereby said cylinder is rotated alternately in opposite directions into said compartment and door registering position in the event of overtravel of said cylinder to either side of said position, manually operable means for rendering said last-mentioned means effective upon opening of said tub door to effect registry with said door of the compartment nearest the same as determined by the direction of rotation of said cylinder at the time said door is opened, manually operable means adapted for subsequently effecting operation of said motor at reduced speed in a manner whereby said cylinder is rotated in a predetermined direction into any one of the compartment and door registering positions, said automatic positioning means being effective upon release of said manually operable means to accurately position said cylinder, and cooperating automatically controlled braking means for reducing overtravel of said cylinder and for finally stopping and holding the same in the selected registered position.

4. In a controller for motor driven washing machines, in combination, a tub having a movable door, a washer cylinder within said tub having a plurality of circumferentially arranged compartments, a reversible motor for rotatably driving said cylinder, control means for said motor including means for automatically effecting periodic reversal and acceleration of said motor, means driven by said motor and adapted to be rendered effective for stopping said cylinder in a position wherein a predetermined one of said compartments is in register with said door, said last-mentioned means being operable automatically to effect operation of said motor in a manner whereby said cylinder is rotated alternately in opposite directions into said compartment and door registering position upon overtravel of said cylinder to either side of said position, means operable for rendering said last-mentioned means effective, manually operable means adapted to effect operation of said motor in one direction under insured conditions of reduced speed for effecting at will registry of any other of said compartments with said door, and cooperating electro-mechanical braking means rendered effective during the automatic registering operation for reducing overtravel of said cylinder and for stopping and holding the same in said registered position, said braking means being also rendered effective upon release of said manually-operable means to stop and hold said cylinder.

15. In a controller for motor driven washing machines, in combination, a tub having a movable door, a washer cylinder within said tub having a plurality of circumferentially arranged compartments, a reversible motor for rotatably driving said cylinder, control means for said motor including means for automatically effecting periodic reversal and acceleration of said motor, control means driven by said motor and adapted to be rendered effective for stopping said cylinder in a position wherein one of said compartments is in register with said door, said last-mentioned means being operable automatically to effect operation of said motor in a manner whereby said cylinder is rotated alternately in opposite directions into said compartment and door registering position upon overtravel of said cylinder to either side of said position, means operable at will for rendering said last-mentioned means effective, means comprising a manually operable switch normally biased to open position and adapted during closure thereof to provide for unidirectional operation of said motor under insured conditions of reduced speed, said switch when released under given conditions being adapted to provide for automatic registration of any other of said compartments with said door in the manner aforementioned, and cooperating electro-mechanical braking means rendered effective during at least a portion of said automatic registering operation for reducing overtravel of said cylinder and for finally stopping and holding the same in said registered position.

16. In a controller for motor driven washing machines, in combination, a tub having a movable door, a washer cylinder within said tub having a plurality of circumferentially arranged compartments, a reversible motor for rotatably driving said cylinder, control means for said motor including means for automatically effecting periodic reversal and acceleration of said motor, control means driven by said motor and adapted to be rendered effective for stopping said cylinder in a position wherein one of said compartments is in register with said door, said last-mentioned means being operable automatically to effect operation of said motor in a manner whereby said cylinder is rotated alternately in opposite directions into said compartment and door registering position in the event of overtravel of said cylinder to either side of said position, means operable at will for rendering said last-mentioned means effective, means comprising a manually operable switch normally biased to open position and adapted during closure thereof to provide for unidirectional operation of said motor under insured conditions of reduced speed, said switch when released under given conditions being adapted to render effective said motor driven control means to insure accurate registry of any other of said compartments with said door, and cooperating electro-mechanical braking means rendered effective during at least a portion of said automatic registering operation for reducing overtravel of said cylinder and for finally stopping and holding the same in said registered position.

17. In a controller for motor driven washing machines, in combination, a tub having a movable door, a washer cylinder within said tub having a plurality of circumferentially arranged compartments, a reversible motor for rotatably driving said cylinder, control means for said motor including means for automatically effecting periodic reversal and acceleration of said motor, control means driven by said motor and adapted to be rendered effective for stopping said cylinder in a position wherein one of said compartments is in register with said door, said last-mentioned means being operable automatically to effect operation of said motor in a manner whereby said cylinder is rotated alternately in opposite directions into said compartment and door registering position in the event of overtravel of said cylinder to either side of said position after initiation of the stopping operation, means operable at will for rendering said last-mentioned means effective, means comprising a manually operable switch normally biased to open position and adapted upon temporary closure thereof to effect unidirectional operation of said motor under insured conditions of reduced speed to provide for registry of the next succeeding compartment with said door, said motor driven control means being adapted to insure accurate registry of said compartment with said door, and cooperating electro-mechanical braking means rendered effective during at least a portion of the automatic registering operation for reducing overtravel of said cylinder and for stopping and holding the same in said registered position.

18. In a controller for motor driven washing machines, in combination, a tub having a movable door, a washer cylinder within said tub having a plurality of circumferentially arranged compartments, a reversible motor for rotatably driving said cylinder, control means for said motor including means for automatically effecting periodic reversal and acceleration of the same, means operable at will to initiate stopping of said motor, said means including means adapted to be rendered effective for stopping the motor with said cylinder in a position wherein one of said compartments is in register with said door regardless of the instantaneous direction of operation of the motor, said last-mentioned means including means driven by said motor and adapted upon initiation of said stopping operation to automatically effect operation of the motor in a manner whereby said cylinder is rotated through a decreasing amplitude of oscillation into said compartment and door registering position, and cooperating braking means adapted to be rendered effective upon initiation of the stopping operation for reducing the degree of oscillation of said cylinder and for eventually stopping and holding the same in said registered position.

RALPH G. LOCKETT.